Feb. 2, 1954  R. E. LANGLOIS ET AL  2,667,681
NAPPER
Filed April 3, 1951  12 Sheets-Sheet 1

INVENTORS
Roland E. Langlois
Louis G. Blumenbaum
BY Cameron, Kerkam & Sutton
ATTORNEYS Feb. 2, 1954    R. E. LANGLOIS ET AL    2,667,681
NAPPER Filed April 3, 1951    12 Sheets-Sheet 3

INVENTORS
*Roland E. Langlois*
*Louis G. Blumenbaum*
BY *Cameron, Kerkam & Sutton*
ATTORNEYS Feb. 2, 1954  R. E. LANGLOIS ET AL  2,667,681
NAPPER
Filed April 3, 1951  12 Sheets-Sheet 4

INVENTORS
Roland E. Langlois
Louis G. Blumenbaum
BY
Cameron, Kerkam & Sutton
ATTORNEYS Feb. 2, 1954   R. E. LANGLOIS ET AL   2,667,681
NAPPER Filed April 3, 1951   12 Sheets-Sheet 6

INVENTORS
*Roland E. Langlois*
*Louis G. Blumenbaum*
BY
*Cameron, Kerkam & Sutton*
ATTORNEYS Feb. 2, 1954   R. E. LANGLOIS ET AL   2,667,681
NAPPER Filed April 3, 1951   12 Sheets-Sheet 9

INVENTORS
Roland E. Langlois
Louis G. Blumenbaum
BY Cameron, Kerkam & Sutton
ATTORNEYS Feb. 2, 1954

R. E. LANGLOIS ET AL 2,667,681

NAPPER

Filed April 3, 1951

INVENTORS
*Roland E. Langlois*
*Louis G. Blumenbaum*
BY
*Cameron, Kerkam & Sutton*
ATTORNEYS Feb. 2, 1954  R. E. LANGLOIS ET AL  2,667,681
NAPPER
Filed April 3, 1951  12 Sheets-Sheet 11

INVENTORS
Roland E. Langlois
Louis G. Blumenbaum
BY Cameron, Kerkam & Sutton
ATTORNEYS Feb. 2, 1954 R. E. LANGLOIS ET AL 2,667,681
NAPPER
Filed April 3, 1951 12 Sheets-Sheet 12

INVENTORS
Roland E. Langlois
Louis G. Blumenbaum
BY Cameron, Kerkam & Sutton
ATTORNEYS Patented Feb. 2, 1954

2,667,681

UNITED STATES PATENT OFFICE 2,667,681

NAPPER

Roland E. Langlois, West Warwick, and Louis G. Blumenbaum, Cranston, R. I., assignors to Paul L. Schulz, Philadelphia, Pa.

Application April 3, 1951, Serial No. 218,942

25 Claims. (Cl. 26—34)

This invention relates to nappers and more particularly to nappers for napping tubular goods.

Heretofore tubular goods have been napped by multiple passes of the same on a conventional napper with the tubular goods doubled in a flat fold. This method leaves much to be desired in efficiency and uniform napping. The present invention overcomes the several difficulties inherent in the present napping of tubular goods. The many advantages of the napper of the present invention are obtained by holding the tubular material in its normal circular shape and by napping it in that shape. The tube of material is moved or slid over a vertical mandrel of proper size. The mandrel is located in the center of the napper by positioning rolls and the material to be napped feeds onto the bottom of the mandrel upwardly over it, and off of the mandrel at its top over a feed roll which is driven to pull the tubular material through the napping machine. The napped tubular material is then wound upon a suitable spool driven by a constant tension motor. Pile and counterpile napping belts are arranged on opposite sides of the mandrel and the tube of material thereon.

The pile and counterpile belts are rotated upon supporting rollers, being endless belts, but the entire assembly of pile and counterpile belts is rotated in a planetary manner about the tube of material to be napped. The counterpile belts are driven at a slightly lower speed than the pile belts and the basic speeds of both sets of belts are determined by the R. P. M. of the planetary assembly multiplied by the diameter of the tube to be napped. This basic speed is either slightly increased or decreased by a suitable mechanism to provide the desired degree of napping. The movement upwardly of the tube being napped requires that the angularity of the napping belts be adjusted with respect to the axis of the tube so that the belts act at a right angle to the composite relative motion thereof. Further, means are provided for adjusting the tension of the napping belts on the material being napped and this means also allows for adjustment of the napper to nap various diameters of tubular cloth.

The napper of the present invention is also arranged for use of various diameter mandrels for supporting the various diameter tubes of material to be napped. Cleaning rolls are provided driven by the napping belts supporting rolls for cleaning the napping belts and the rotation of the planetary assembly is utilized in connection with the housing surrounding the same to provide a fan action to keep the assembly free and clear of lint.

It is accordingly an object of the present invention to provide a novel napper in which pile and counterpile endless rotating napping belts are employed on opposite sides of the tube of material being napped and the entire assembly of napping belts is moved in a planetary manner about the material to be napped.

Another object is to provide such a napper in which the speed of the napping belts over the material to be napped is the product of the R. P. M. of the planetary system and the diameter of the tube being napped plus or minus a controlled increment to provide the desired degree of napping.

Another object is to provide such a napper in which the basic speed of the napping belts is determined by the product of the R. P. M. of the planetary assembly and the diameter of the tube to be napped; in which the basic speed can be readily adjusted for each diameter of tube to be napped; and in which the increment to the basic speed to obtain the desired degree of napping is readily introduced by a controlled variable speed motor driving into a novel gear box.

Another object is to provide such a napper in which the tube of material to be napped is pulled vertically over the mandrel supporting the material during napping by a feed roll above the top of the mandrel driven at controlled speeds.

Another object is to provide such a napper in which the material to be napped is firmly supported or backed upon a mandrel and is napped by endless pile and counterpile napping belts which bear resiliently thereon.

Another object is to provide such a napper in which the tension of the napping belts on the material to be napped is readily adjustable.

Another object is to provide such a napper in which the angularity of the belts with respect to the axis of the tube of material to be napped is readily adjustable so that the napping action is always conducted at a right angle to the composite relative motion of the material being napped.

Another object is to provide such a napper in which the mandrel supporting the tubular material during napping may be readily introduced in the napper so that various diameter mandrels may be employed for various diameters of material to be napped.

Another object is to provide such a napper in which the position of the pile and counterpile napping belts is readily adjustable for the various diameters of material to be napped.

Another and still further object is to provide such a napper in which cleaning rolls are driven by the rolls supporting the pile and counterpile belts to clean the belts.

Another object is to provide such a napper in which the motion of the planetary napping structure and the housing surrounding the same are utilized to produce a fan action to keep the napping assembly free of lint.

Another object is to provide such a napper in which a main drive motor is employed to rotate the planetary napping assembly and which also drives the pile and counterpile napping belts through suitable change speed gearing to obtain the basic speed ratio of the napping belts as determined by the R. P. M. of the planetary napping assembly multiplied by the diameter of the material to be napped. These gears are suitably arranged so that various diameter gears may be substituted to provide this basic speed ratio for any diameter of material to be napped.

Another object is to provide such a napper in which the drive from the main drive motor is taken to suitable gearing at the top of the planetary napping assembly to drive the counterpile napping belts and the pile napping belts are driven by the main driving motor through suitable gearing arranged at the bottom of the planetary napping assembly.

Another and still further object is to provide such a napper in which the mandrel supporting the material to be napped is held and centered in position along the axis of the planetary napping assembly by a novel arrangement of supporting and centering rolls.

Another object is to provide such a napper in which the material to be napped is fed continuously through the napper and shut down of the napper is required only when the diameter of the tube of material to be napped is altered.

Another object is to provide such a napper in which the degree of napping and the uniformity thereof is subject to closer control than has heretofore been possible.

Another object is to provide such a napper which is efficient and can be maintained and operated by a relatively unskilled personnel.

Other and further objects of the present invention will appear from the following description of an illustrative embodiment thereof.

The napper of the present invention is capable of various mechanical embodiments and various controls can be employed for the various driven components thereof. An illustrative embodiment of the napper of the present invention is shown in the accompanying drawings and is described hereinafter for purposes of illustrating the same. This illustrative embodiment should in no way be construed as defining or limiting the scope of the invention and reference should be had to the appended claims for this purpose.

In the accompanying drawings, in which like reference characters indicate like parts, Fig. 1 is a front elevation of an illustrative embodiment of the novel napper of the present invention with a portion of the housing broken away to show in general the arrangement of the planetary napping assembly and the feed of the tube of material to be napped through the napping assembly and the feed of napped material away from the napping assembly;

Figure 15:
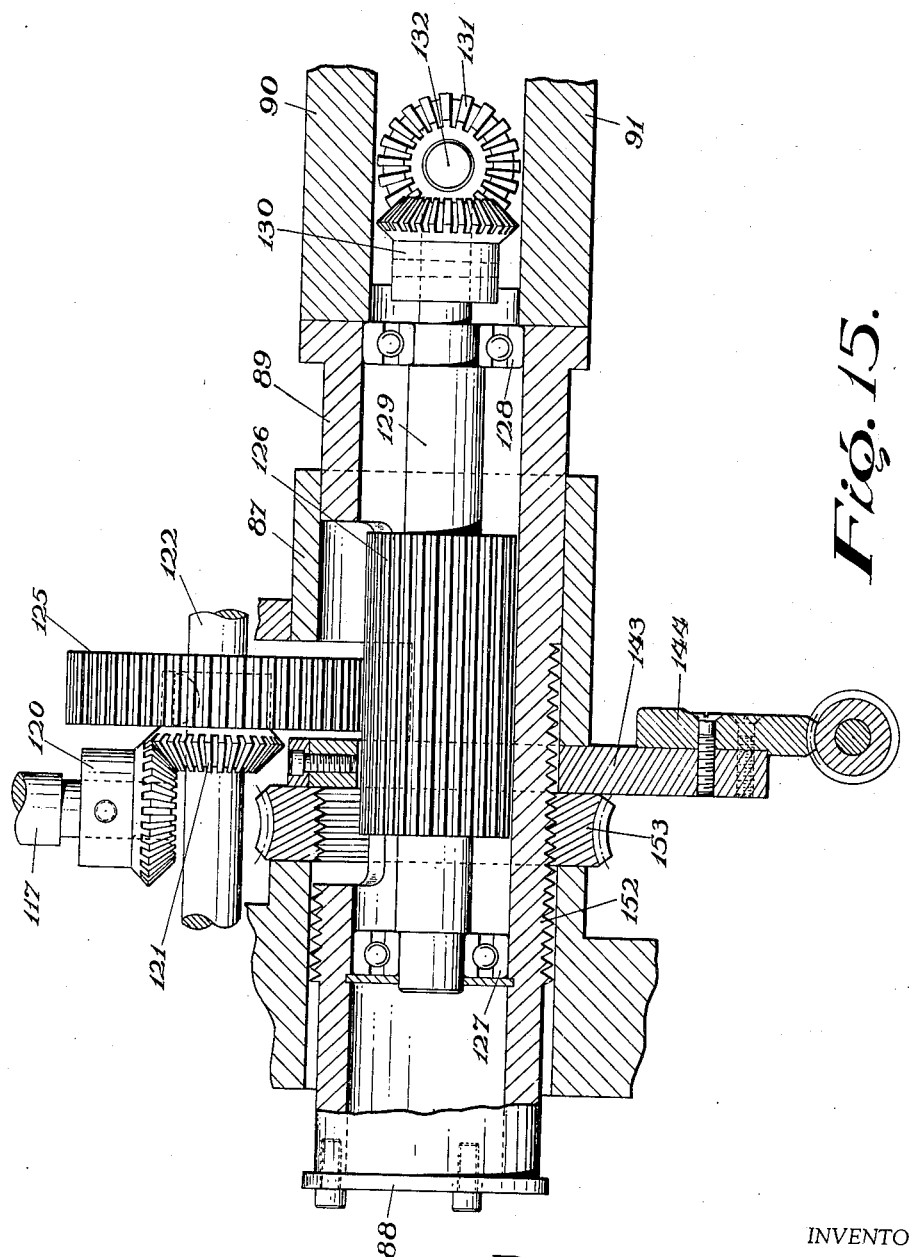

Fig. 15 is an enlarged detail of the mechanism employed for driving the counterpile napping belts; for adjusting the angularity of such belts with respect to the direction of motion of the material being napped; for adjusting the position of such belts with respect to the diameter of the material being napped; and for adjusting the tension of the napping belts with respect to the material being napped.

Figure 1:
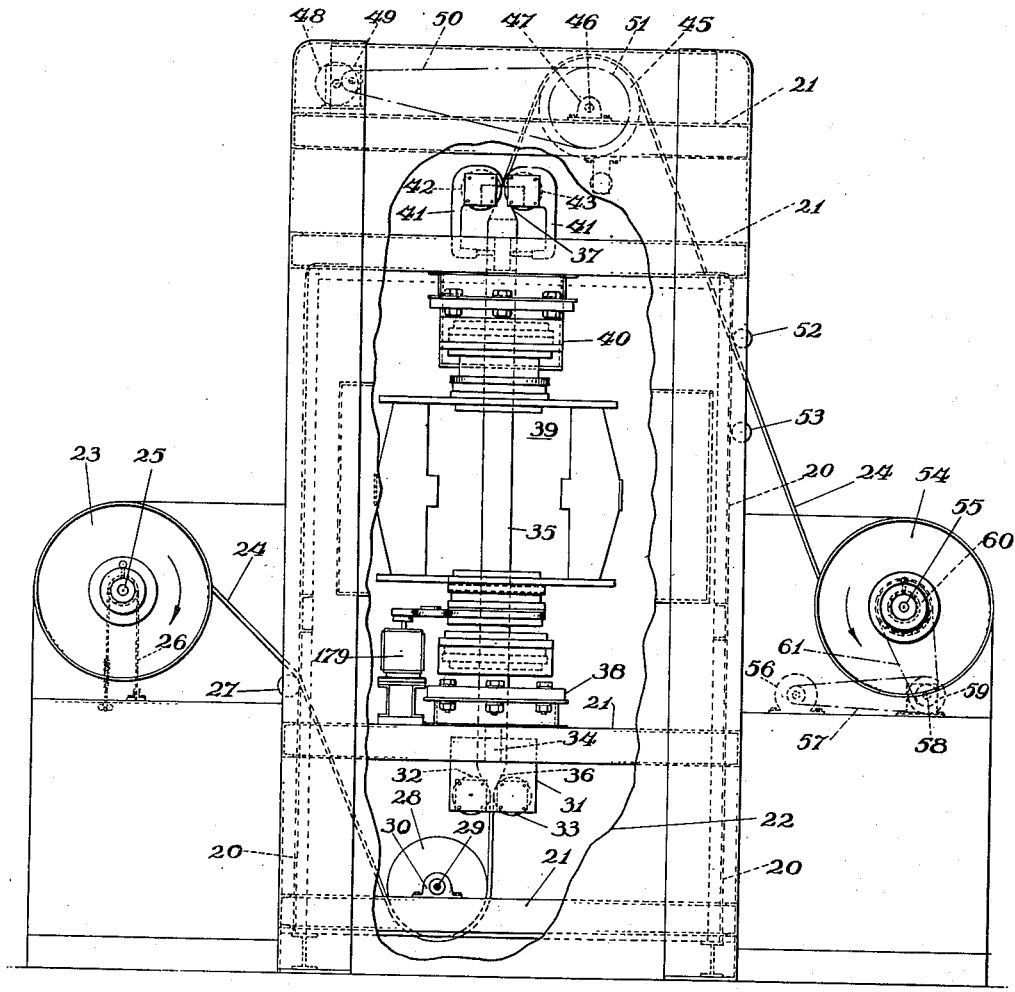
Figure 2:
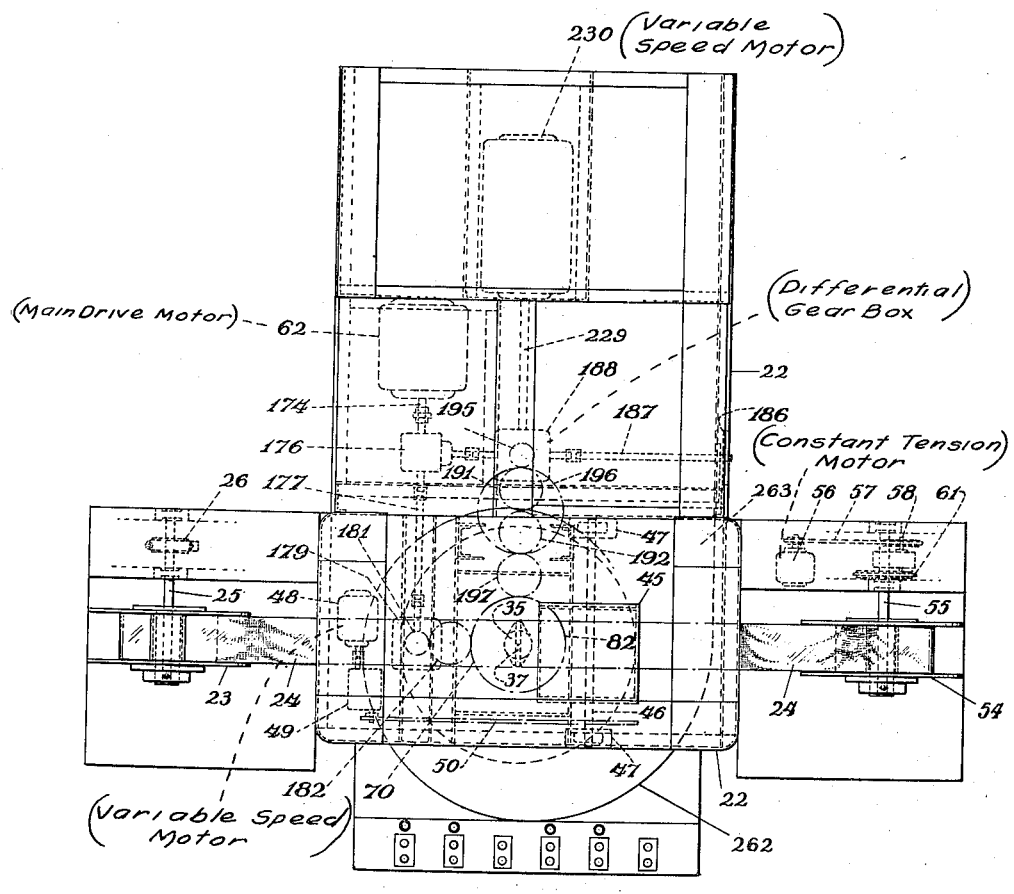
Fig. 2 is a view from above of the embodiment of Fig. 1 showing the general arrangement of the several component parts thereof.

Referring now more particularly to Figs. 1 and 2 the illustrative embodiment of the napper of the present invention is seen to include suitable vertical framing 20 interconnected by suitable horizontal framing 21. The framing 20 and 21 is suitably enclosed by housings 22. A roll 23 for supporting the tube of material 24 to be napped is rotatably mounted upon shaft 25 which is supported by framing 20 and 21. A Prony brake 26 is provided to prevent roll 23 from overrunning and to require that the tube of material 24 to be napped be pulled therefrom.

Figure 12:
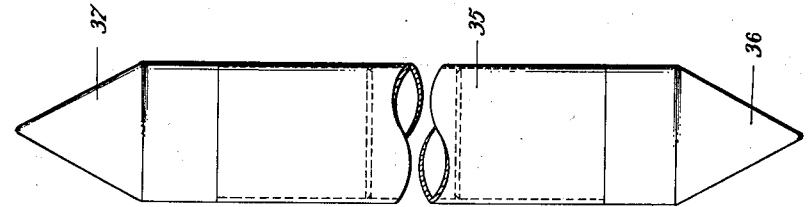
Fig. 12 is a side view of the mandrel of Fig. 11.
Figure 11:
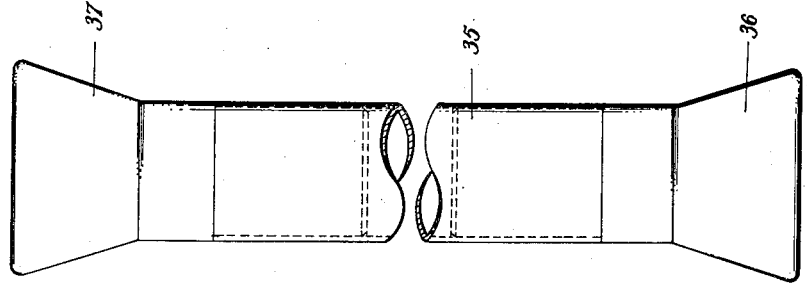
Fig. 11 is a view of the mandrel employed in the embodiment of invention of Fig. 1 to support the tube of material during napping.

An idling roller 27 is provided in one side of housing 22 and is rotatably mounted on framing 20. Tube 24 passes over roller 27 and then under roller 28. Roller 28 idles on shaft 29 which is supported in bearings 30 on framing 21. Spaced above roller 28 and arranged medially within the framing 20 and 21 is housing 31 secured to horizontal framing 21. A pair of spaced rollers 32 and 33 are mounted in housing 31 and a second pair of spaced rollers 34 at right angles to rollers 32 and 33 are also mounted in housing 31. A cylindrical mandrel 35 having flattened ends 36 and 37 (Figs. 11 and 12) is supported at its lower extremity by rollers 32 and 33, flattened extremity 36 fitting into the space therebetween. Spaced rollers 34 hold mandrel 35 from lateral movement in rollers 32 and 33. Tube 24 passes upwardly between rollers 32 and 33 and between the pair of rollers 34 and over the mandrel 35. Mandrel 35 provides support for tube 24 during the napping operation.

Figure 4:
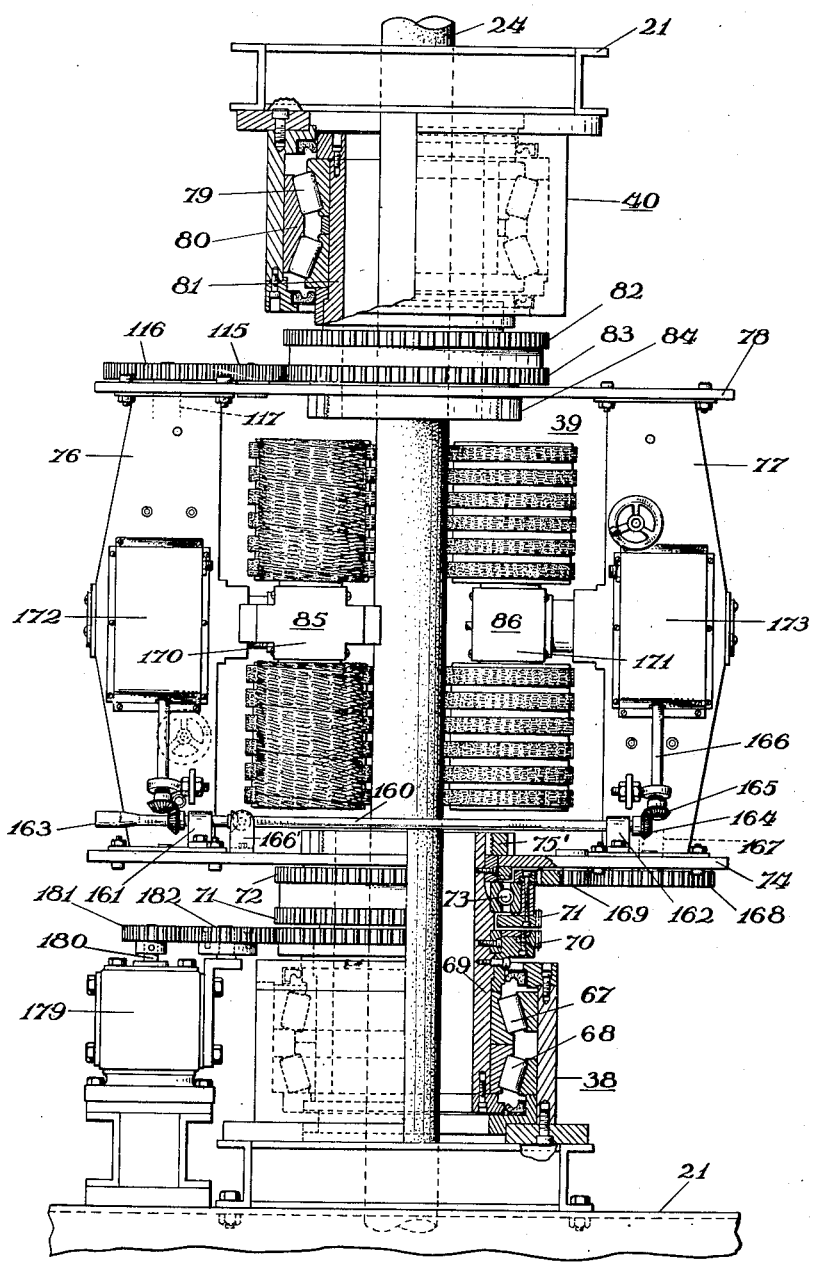
Fig. 4 is a view of the planetary napping assembly of the embodiment of Fig. 1, partially in section, with the surrounding housing removed to show the general arrangement of the several parts thereof.
Figure 13:
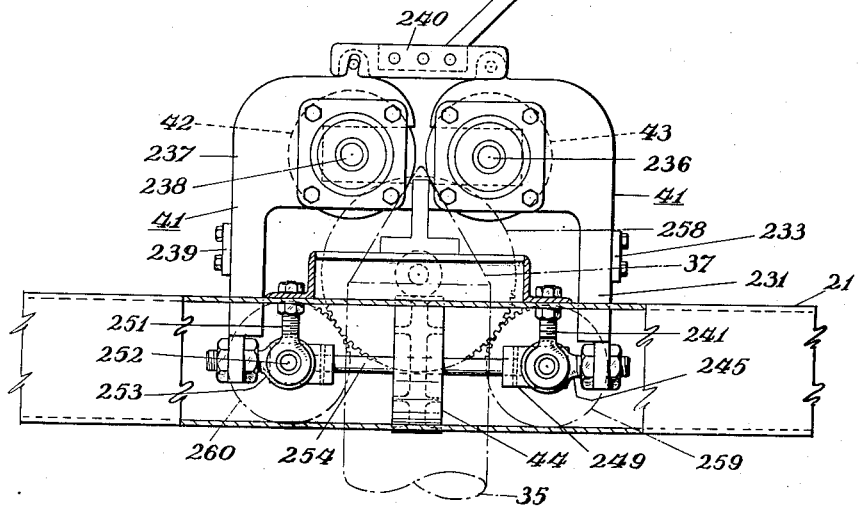
Fig. 13 is an enlarged detail of the roll assembly shown at the top of Fig. 1 for supporting the upper end of the mandrel and showing the mechanism employed for opening these rolls to permit ready insertion and removal of the mandrel.
Figure 14:
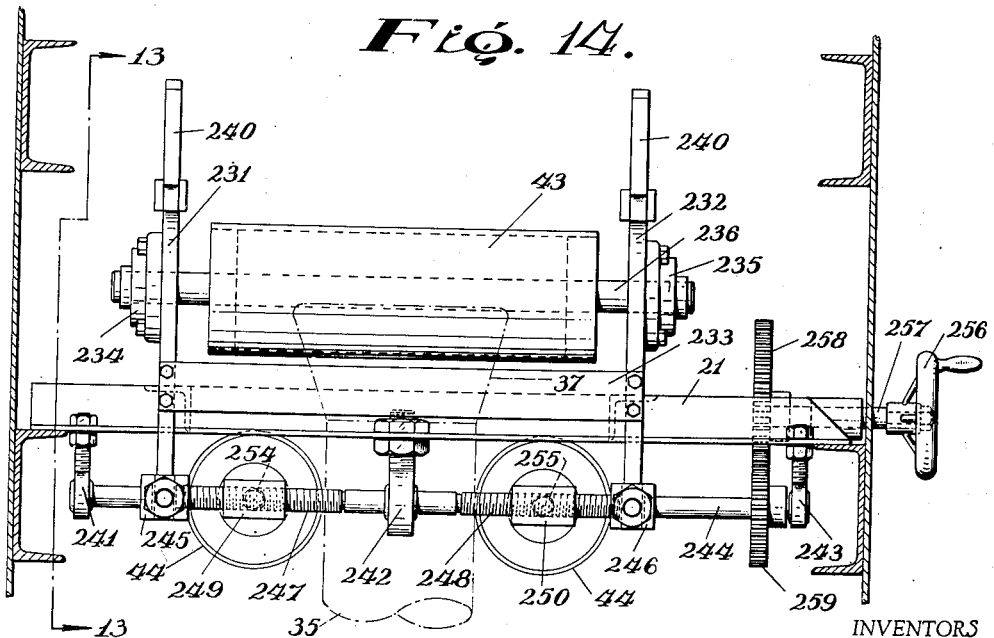
Fig. 14 is a view from the right of the roll assembly of Fig. 13.

A suitable bearing shown generally at 38, and shown in more detail in Fig. 4, is mounted axially above housing 31 and is secured to framing 21. Mandrel 35 and tube 24 pass axially through bearing 38. Bearing 38 provides the lower support for the planetary napping assembly generally shown at 39 which will be described in detail with respect to Figs. 4, 5 and 7. The upper end of the planetary napping assembly 39 is supported for rotation in upper bearing 40 which is secured to framing 21 axially above bearing 38. Mandrel 35 and tube 24 pass through bearing 40. A suitable framework generally indicated at 41, and seen in detail in Figs. 13 and 14, is mounted axially above bearings 38 and 40 and carries spaced rollers 42 and 43 between which flattened end 37 of mandrel 35 is supported. Framework 41 also carries a pair of spaced rollers 44 bearing on mandrel 35 to prevent lateral movement of mandrel 35 in rollers 42 and 43. Tube 24 passes between the pair of rollers 44 and rollers 42 and 43. As will more fully appear hereinafter, frame 41 is arranged for displacement of rollers 42 and 43 so that mandrel 35 may be removed and the pair of rollers 44 is adustable for various diameter mandrels.

After leaving rollers 42 and 43 tube 24 passes over the driven feed roller 45 which is mounted on shaft 46 supported in bearings 47 mounted on framing 21. Roller 45 is driven by a variable speed electric motor 48 through suitable gearing 49 and belt 50, belt 50 driving pulley 51 mounted on shaft 46. Driven roller 45 provides the energy for drawing tube 24 off of roll 23 and upwardly over mandrel 35. After leaving driven roller 45 tube 24 passes between idler guide rollers 52 and 53 supported by framing 20 and is wound upon takeup roll 54. Roll 54 is mounted upon shaft 55 which is supported in framing 20 and 21. Roll 54 is driven by a constant tension motor 56 which drives belt 57. Belt 57, through jack shaft 58, drives pulley 59 which in turn, through belt 61, drives pulley 60 fixed to shaft 55. Constant tension motor 56 is provided to drive roll 54 to wind tube 24 thereon but does not exert sufficient force on tube 24 to influence its movement over mandrel 35.

A main drive motor 62 is provided for rotating the planetary napping assembly 39, as will more fully appear hereinafter, and motor 62, acting through suitable gear trains to be described, also drives the napping belts.

Figure 3:
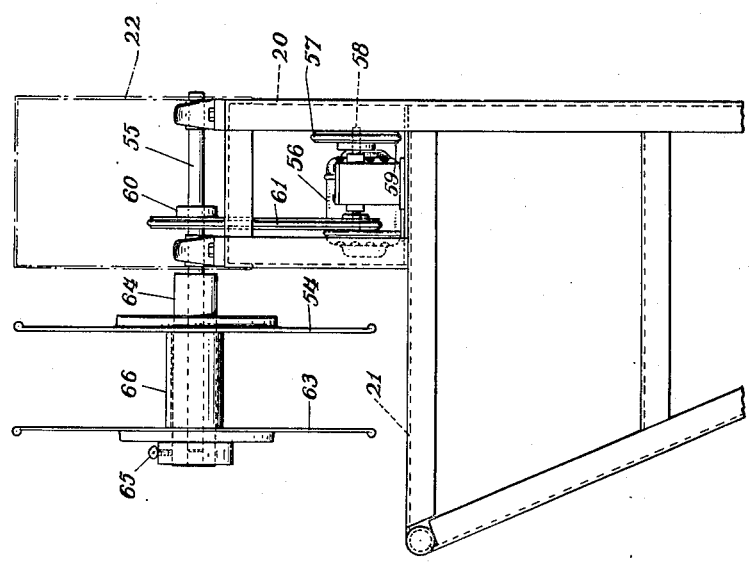
Fig. 3 is a view from the right of a portion of the embodiment of Fig. 1 to show the constant tension mechanism for rolling up the napped tube of material.

As seen in Fig. 3, roll 54 may be provided with a removable outer plate 63 which is secured to hub 64 of roll 54 by any suitable means here shown as set screws 65. Plate 63 is removable to permit a core 66 to be slipped onto hub 64 to support the rolled up tube 24 so that the same may be readily removed from roll 54 after napping is completed.

Figure 5:
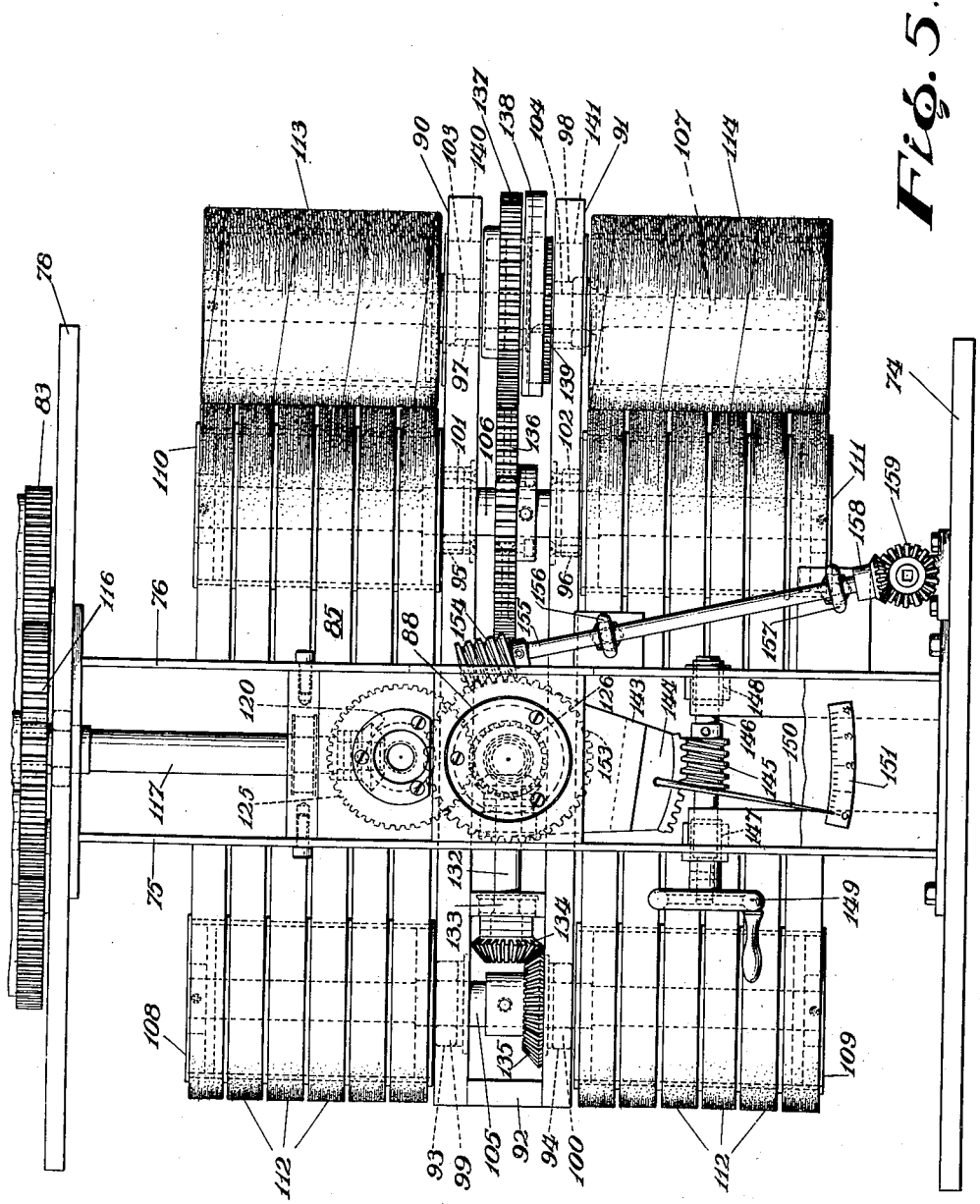
Fig. 5 is an enlarged detail of the planetary napping assembly as seen from the left in Fig. 4.
Figure 7:
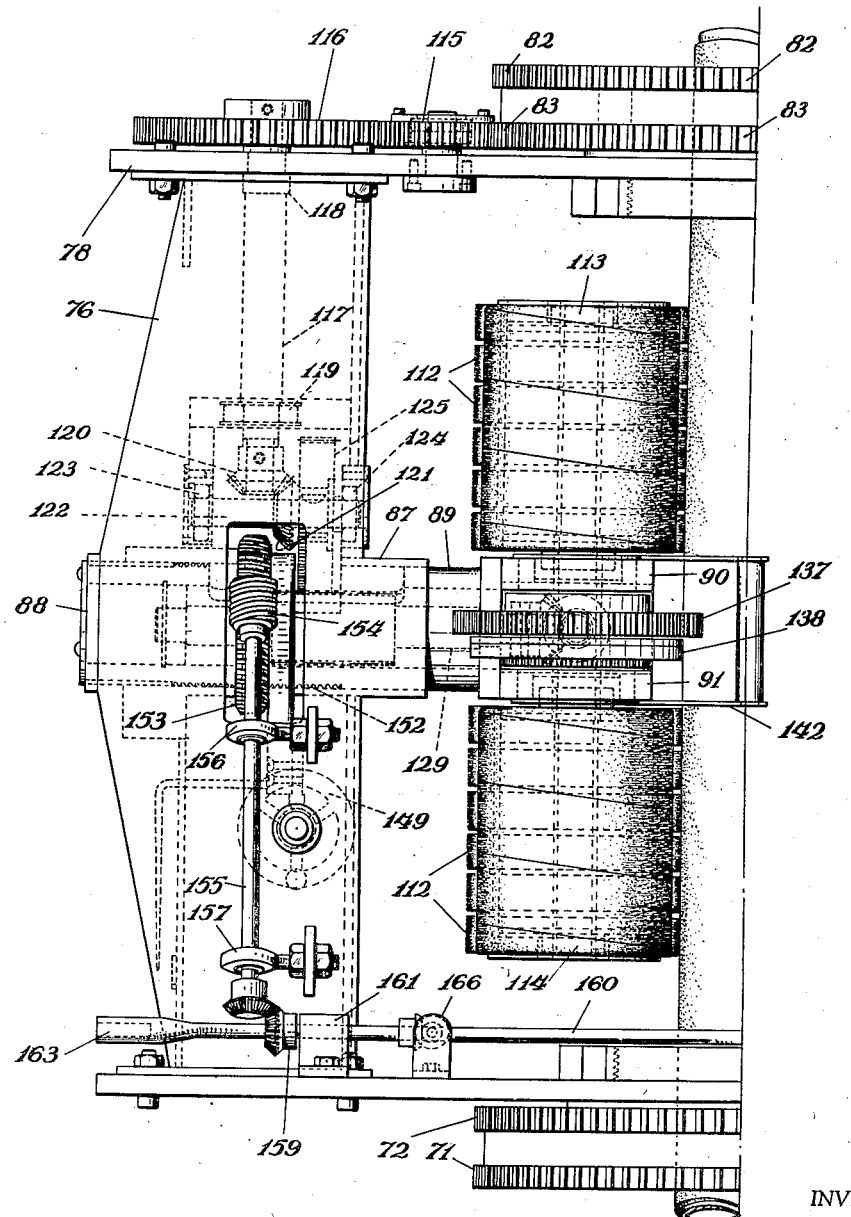
Fig. 7 is an enlarged view of the counterpile napping assembly as seen in the left hand portion of Fig. 4 with certain of the housings removed to show arrangements of driving gears.

The planetary napping assembly generally indicated at 39 is shown in detail in Figs. 4, 5 and 7. Referring to these figures, lower bearing 38 is provided with suitable roller bearing members 67 and 68 which support hub 69 for rotation, providing both lateral and thrust support. Hub 69 passes upwardly out of bearing 38 and has ring gear 70 secured thereto. A pair of ring gears 71 and 72 are interconnected and idle upon hub 69 supported by a suitable bearing 73. Ring gears 71 and 72 are a part of the gear train driving the pile napping belts as will more fully appear hereinafter. Hub 69 supports a plate 74 which is suitably secured thereto as by ring nut 75'. Plate 74 provides the base element for the planetary napping assembly 39. Suitably secured to plate 74 and spaced at opposite ends of a diameter thereof are pairs of spaced uprights 75 and 76 and 77. An upper plate 78 is secured to uprights 75 and 76 and to uprights 77.

Upper bearing 40 is provided with a pair of roller bearing members 79 and 80 to take the end and lateral thrust of a hollow hub 81. Hub 81 extends downwardly out of bearing 40 and a pair of connected ring gears 82 and 83 is rotatably mounted thereon and is a part of the gear train driving the counterpile napping belts, as will more fully appear hereinafter. Plate 78 is suitably mounted on hub 81 and is secured thereto by ring nut 84. Plates 74 and 78 are centrally cut away to permit mandrel 35 and tube 24 to pass therethrough.

The counterpile napping belt assembly is generally indicated at 85 and the pile napping belt assembly is generally indicated at 86. Both assemblies 85 and 86 are of similar construction differing only in that assembly 85 is driven from the top of the planetary assembly 39 while assembly 86 is driven from below assembly 39, as will be described in detail hereinafter. A description of one of the assemblies 85 and 86 should suffice for both and for this purpose counterpile assembly 85, as shown in Figs. 5, 7 and 15, will be employed. The drive for assembly 86 will be considered hereinafter in connection with the drives for planetary assembly 39 and assembly 85.

Assembly 85 includes a hollow hub 87 carried between uprights 75 and 76, or formed integrally therewith, and the outer end of hub 87 is closed by a removable plate 88. A hollow trunnion 89 is mounted for axial and rotary movement in hub 87 and supports spaced parallel beams 90 and 91 extending at right angles to the axis thereof. Beams 90 and 91 may be provided with a suitable number of spacers 92. Beams 90 and 91 are suitably bored at 93, 94, 95, 96, 97 and 98 to receive suitable bearings 99, 100, 101, 102, 103 and 104 respectively. Shaft 105 is rotatably mounted in bearings 99 and 100; shaft 106 is rotatably mounted in bearings 101 and 102; and shaft 107 is rotatably mounted in bearings 103 and 104. Cylindrical pulleys 108 and 109 are mounted on shaft 105 for rotation therewith and cylindrical pulleys 110 and 111 are mounted for rotation on shaft 106. Counterpile napping belts 112, which are endless belts, pass around pulleys 108 and 110 and around pulleys 109 and 111. A suitable number of belts 112 may be used, here shown as twelve in number, and belts 112 are of conventional construction having a flexible body supporting wire bristles. Cleaning rolls 113 and 114 are mounted for rotation with and upon shaft 107. Rolls 113 and 114 are covered with wire bristles which interdigitate with the bristles of the napping belts 112 to clean lint from them. The degree of interdigitation of rolls 113 and 114 with belts 112 can be adjusted, as will be more fully described hereinafter.

Belts 112 are rotated by rotation of pulleys 108 and 109, pulleys 110 and 111 being driven by belts 112. Pulleys 108 and 109 are rotated by the rotation of gears 82 and 83. Gear 83 meshes with an idler gear 115 mounted for rotation on plate 78. Gear 115 in turn meshes with gear 116 which is mounted on shaft 117 extending downwardly between uprights 75 and 76. Shaft 117 is provided with suitable bearings 118 and 119 supported by uprights 75 and 76 and terminates in a bevel gear 120. Bevel gear 120 meshes with a second bevel gear 121 which is carried on a short shaft 122 extending at right angles to shaft 117. Shaft 122 is mounted in bearings 123 and 124. A large gear 125 is mounted on shaft 122 and meshes with cylindrical toothed member 126 mounted within hollow hub 87 and hollow trunnion 89, as will be seen in detail in Fig. 15. Hollow trunnion 89 is provided with bearings 127 and 128 which rotatably support shaft 129. Member 126 is secured to shaft 129 to rotate the same. Shaft 129 terminates in a bevel gear 130 which in turn meshes with a bevel gear 131 secured to shaft 132. Shaft 132 is provided with suitable bearings 133 aligning it between members 90 and 91. Shaft 132 terminates in bevel gear 134 which meshes with bevel gear 135 mounted between beams 90 and 91 on shaft 105. Thus rotation of gear 83 transmits rotary motion through the several gears and shafts just described to shaft 105 which when rotated rotates pulleys 108 and 109 which in turn rotate napping belts 112 and pulleys 110 and 111.

Figure 6:
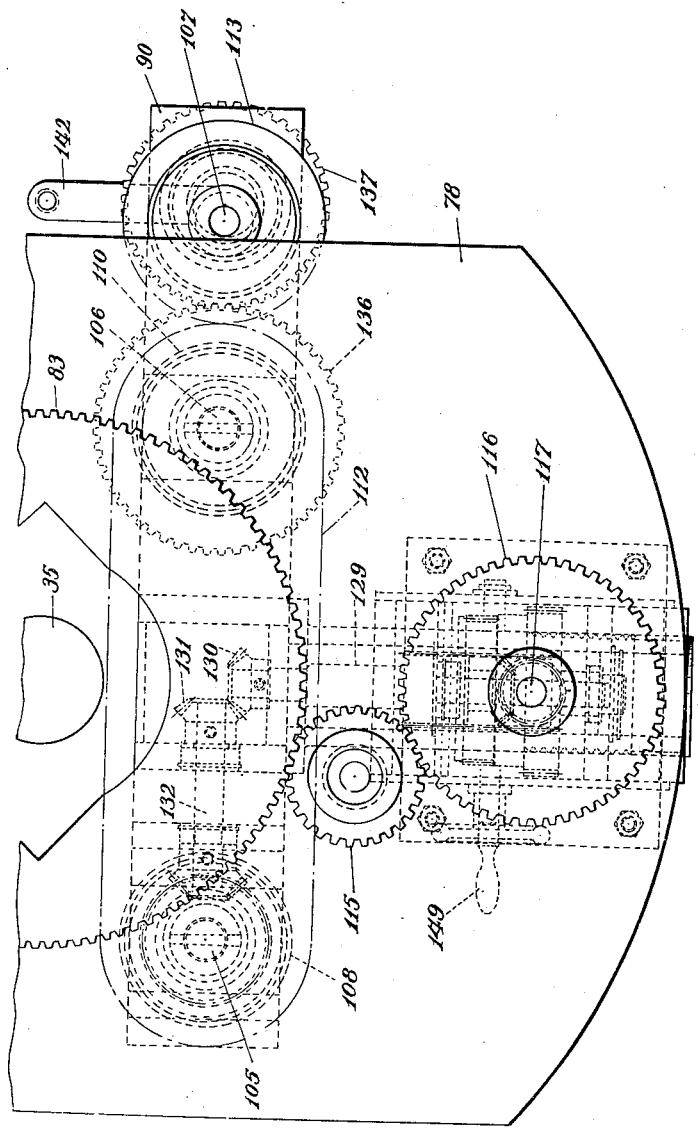
Fig. 6 is a view from above of the portion of the planetary napping assembly shown in Fig. 5.

Cleaning rolls 113 and 114 are rotated by pulleys 110 and 111 rotating shaft 106. Shaft 106 carries a gear 136 between beams 90 and 91 and gear 136 meshes with a gear 137. Gear 137 is supported for rotation between beams 90 and 91 and an internal ring gear 138 is mounted for rotation therewith. A gear 139 is mounted on shaft 107 and meshes with ring gear 138. Bearings 103 and 104 supporting shaft 107 are mounted in eccentrics 140 and 141 which are rotatably mounted in beams 90 and 91 respectively. Rotation of eccentrics 140 and 141 is obtained by handle 142 (Fig. 6) which is removably mounted in suitable slots therein. Rotation of eccentrics 140 and 141 determines the degree of interdigitation of cleaning rolls 113 and 114 with napping belts 112. After rolls 113 and 114 are adjusted with respect to belts 112 handle 142 is removed and eccentrics 140 and 141 are locked in position by suitable means such as set screws, not shown.

The angularity of belts 112 with respect to the tube 24 being napped must be adjustable so that the napping action of the belts is always conducted at right angles to the composite relative motion of the tube 24. For this purpose a rack 143 embraces trunnion 89 and is keyed thereto so that rotation of rack 143 will rotate trunnion 89 and beams 90 and 91 thereby rotating belts 112 about the axis of trunnion 89 and varying the angle of belts 112 with tube 24. Rack 143 permits movement of trunnion 89 therethrough in a direction along the axis of trunnion 89. Rack 143 is provided with a toothed segment 144 which is engaged by worm gear 145. Worm gear 145 is mounted for rotation on and with shaft 146 which is carried in bearings 147 and 148 mounted on uprights 75 and 76 respectively. A hand wheel 149 is provided and mounted on shaft 146 to rotate worm gear 145 and through the described rack arrangement to adjust belts 112 angularly with respect to tube 24. A pointer 150 on segment 144 and a scale 151 may be provided to show the angularity of belts 112.

As pointed out above, the position of belts 112 must be adjustable with respect to the diameter of the mandrel 35 and of tube 24 so that various sizes of mandrels and tubes can be accommodated and also to adjust the tension of belts 112 on tube 24. To this end trunnion 89 is axially movable in hub 87 and a manually actuated mechanism is provided to move trunnion 89 axially in hub 87. As seen in Fig 15, trunnion 89 is externally threaded at 152 and an internally threaded gear 153 is mounted thereon. Gear 153 is mounted between shoulders formed in hub 87 to prevent movement thereof axially of trunnion 89. A worm gear 154 meshes with gear 153 and is rotated by shaft 155. Shaft 155 rotates in bearings 156 and 157 carried by upright 76 and terminates in bevel gear 158. Bevel gear 158 meshes with bevel gear 159 carried by shaft 160. Shaft 160 is mounted for rotation in bearings 161 and 162 carried by plate 74. One end of shaft 160 is provided with a socket 163 to receive a crank for rotating the same and its other end terminates in bevel gear 164. Bevel gear 164 meshes with bevel gear 165 to rotate shaft 166 to provide axial adjustment for the napping belts of pile napping assembly 86. Since shaft 160 provides rotation for adjustment of the napping belts of both assemblies 85 and 86 the belts of each assembly will be in similar adjustment with respect to the tube 24. An indicator 166′ driven by shaft 160 may be provided to show the positions of the napping belts.

As noted above pile napping assembly 86 is in every way identical to the counterpile napping assembly 85, just described, except that it is driven from below the planetary assembly 39 rather than from above. To this end shaft 167, which corresponds to shaft 117, extends downwardly between the pair of uprights 77 and terminates in gear 168. Gear 168 meshes with an idler gear 169 which is mounted for rotation under plate 74 and gear 169 meshes with ring gear 72.

Cover plates are provided to enclose the beams 90 and 91 and are seen at 170 in Fig. 4 and the corresponding plate for assembly 86 is seen at 171. Cover plate 172 is provided for the gearing between uprights 75 and 76 and plate 173 corresponds thereto for assembly 86.

Figure 8:
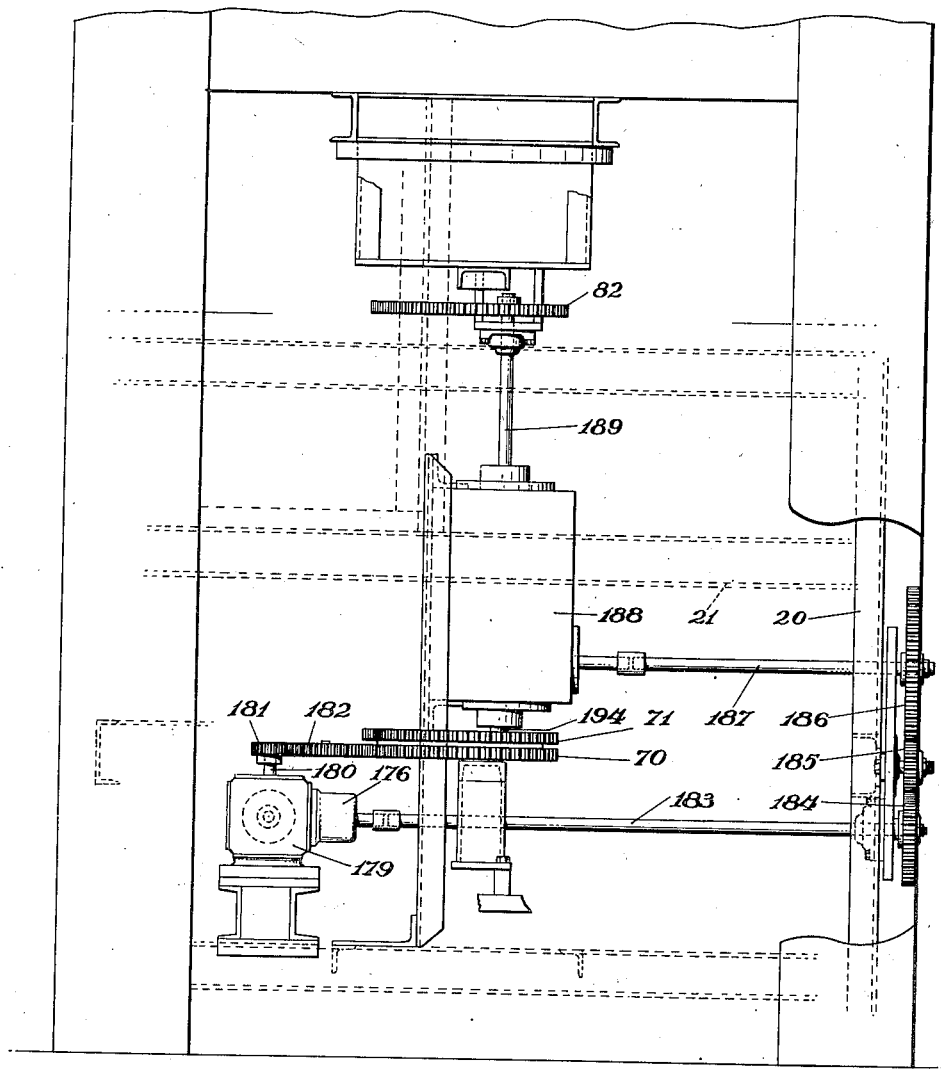
Fig. 8 is a view from the front of the embodiment of Fig. 1 with certain elements thereof omitted to show the gearing arrangement for driving the planetary napping assembly and for driving the pile and counterpile napping belts including the change speed gearing for adjustment of napping belt basic speed for various diameter tubes to be napped.
Figure 9:
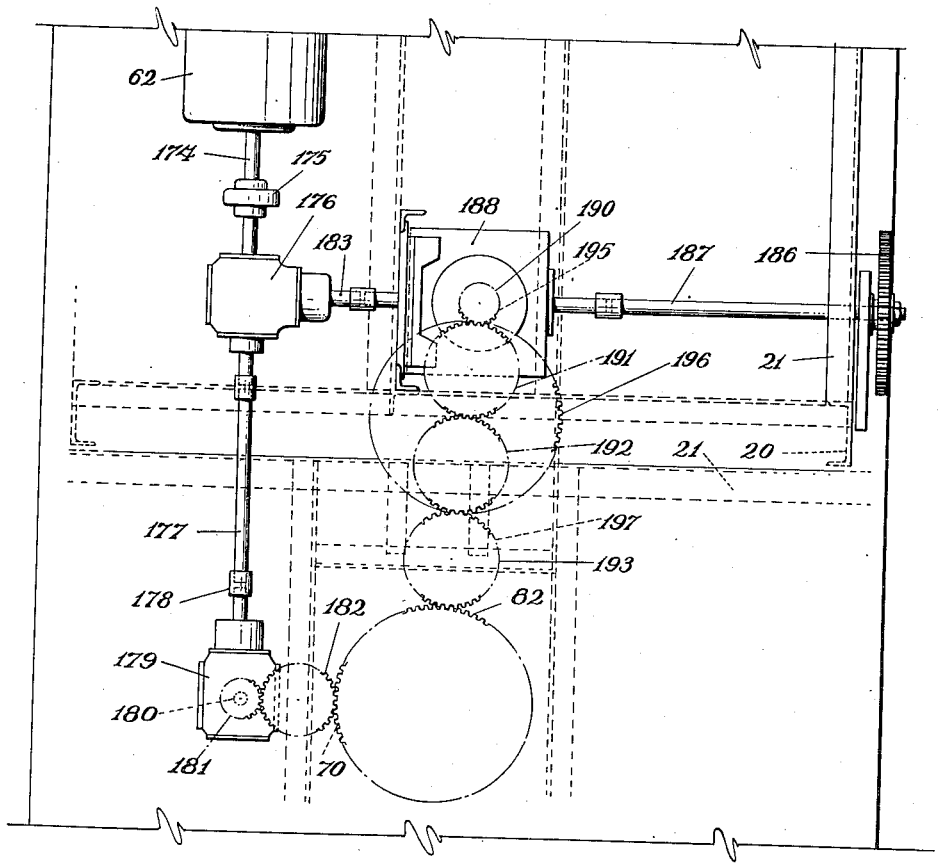
Fig. 9 is a view from above of the gear train shown in detail in Fig. 8.

As generally described above, main motor 62 drives not only the planetary napping assembly 39 but also drives the pile and counterpile napping belt assemblies 85 and 86. It was also pointed out that the napping belts must have a basic velocity equal to the product of the R. P. M. of assembly 39 and the diameter of the tube 24 being napped. An increment of velocity is added to or subtracted from this basic velocity to obtain the desired degree of napping, it being remembered that the counterpile belts rotate at slightly less velocity than the pile belts. The gear trains to furnish these drives are shown in detail in Figs. 8, 9 and 10 in which other elements of the napper are not shown for clarity of illustration. Motor 62 drives shaft 174 through universal joint 175 into change direction gear box 176. Shaft 177 leads from gear box 176 through coupling 178 to gear box 179. A shaft 180 leads from gear box 179 and carries gear 181. Gear 181 meshes with idler gear 182 which in turn meshes with ring gear 70 rotating the planetary napping assembly 39.

A shaft 183 leads from gear box 176 to gear 184 of the change speed gearing. Gear 184 meshes with idler gear 185 which in turn meshes with gear 186 mounted on shaft 187. Gears 184, 185 and 186 constitute the change speed gearing and are mounted for ready removal and replacement by gears of various diameters so that the basic napping belt velocity may be obtained for various diameters of tubes 24 being napped. Shaft 187 leads into differential gear box 188 that provides the increment to the basic napping belt speed as will more fully appear hereinafter. A counterpile napping belt drive shaft 189 leads from the top of gear box 188 and terminates in gear 190. Gear 190 is connected to ring gear 82 through a gear train of three idler gears 191, 192 and 193. The rotation thus provided ring gear 82 rotates ring gear 83 and, as described above, rotates the counterpile napping belts 112.

A shaft 194 leads downwardly from gear box 188 and terminates in a gear 195 which meshes with idler gear 196. Idler gear 196 drives idler gear 197 which in turn is meshed with and drives ring gear 71 to drive ring gear 72 and the pile napping belts as described above. Large idler gear 196 is employed in the pile belt gear train in place of the two idler gears 191 and 192 in the counterpile belt gear train so that ring gears 71 and 82 will be rotated in the same direction since shafts 189 and 194 rotate in opposite directions because of the differential gearing in box 188 to be described.

Figure 10:
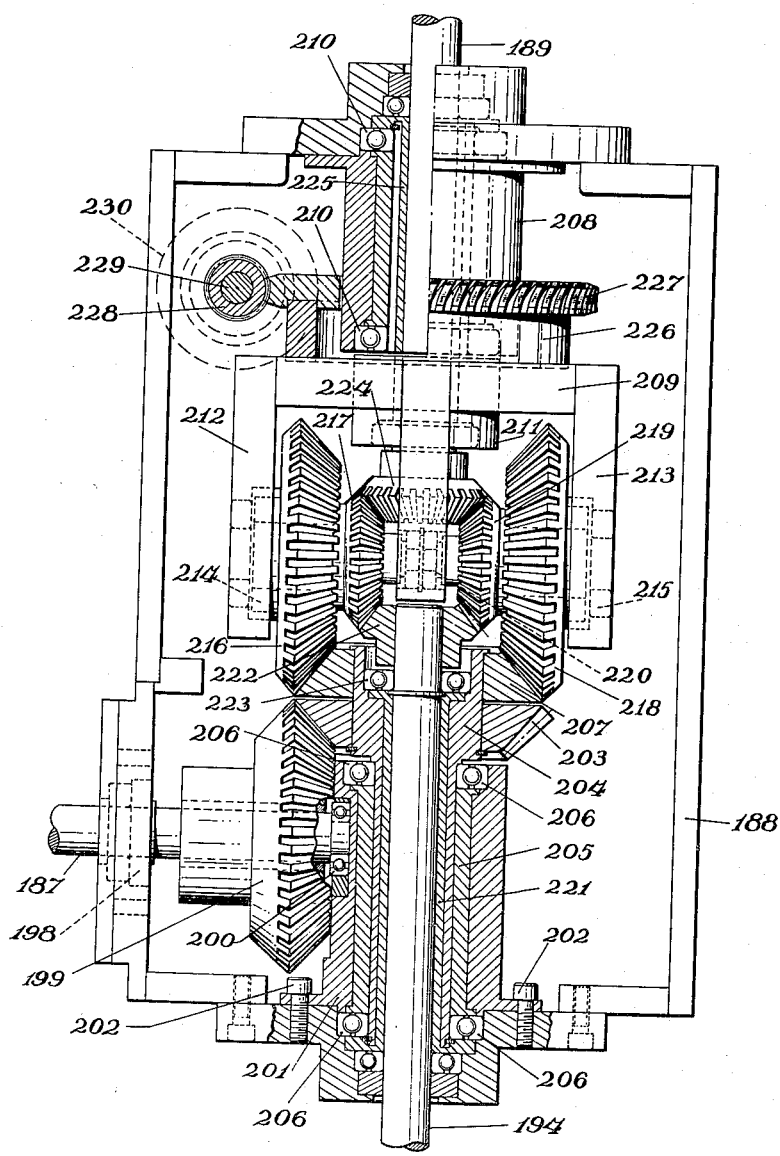
Fig. 10 is a view, partly in section, of the gear box employed for supplying the increment to the basic speed of the pile and counterpile napping belts to obtain the desired degree of napping of the material being napped.

Differential gear box 188 is shown in Fig. 10 where it is seen that shaft 187, driven by main drive motor 62, is provided with a bearing 198 in a wall of box 188 and drives a bevel gear 199. The inner end of shaft 187 is mounted for rotation in bearing 200 which is mounted externally of hollow hub 201. Hub 201 is suitably secured as by bolts 202 to the bottom of gear box 188. Gear 199 meshes with a bevel gear 203 which is carried by and fixed to a hollow shaft 204. Shaft 204 extends downwardly in hub 201 and is free to rotate therein through interposed sleeve 205 and bearing 206. Shaft 204 carries bevel gear 207 at its upper extremity for rotation therewith.

The upper end of gear box 188 is provided with a hollow hub 208 in which yoke 209 is rotatably mounted. Bearings 210 are provided to reduce friction of these rotating parts. The hub 211 of yoke 209 is hollow to permit shaft 189 to pass therethrough for rotation therein. Yoke 209 is provided with arms 212 and 213 having bearings 214 and 215 mounted therein respectively. Bearing 214 rotatably supports a bevel gear 216 which meshes with gear 207 and drives a smaller bevel gear 217. Bearing 215 rotatably supports a bevel gear 218 which meshes with gear 207 and drives a smaller bevel gear 219. A suitable bearing 220 may be provided to support the abutting ends of the gears 218 and 219, respectively. Shaft 194 passes upwardly through hollow hub 201 and hollow shaft 204 and is separated from the latter by bearing sleeve 221. Shaft 194 terminates in bevel gear 222 which meshes with gears 217 and 219. A bearing 223 is interposed beneath gear 222 and the top of sleeve 221.

Shaft 189 extends downwardly through hollow hub 208 and through the hollow hub 211 of yoke 209 and terminates in bevel gear 224 which meshes with gears 217 and 219. A suitable bearing sleeve 225 is provided to insure free rotation of shaft 189. Yoke 209 is provided with an upstanding collar 226 which is secured thereto and surrounds hub 208. A ring gear 227 is mounted on collar 226 and is driven by a worm gear 228. Worm gear 228 is mounted on shaft 229 which is driven by a variable speed electric motor 230 (Fig. 2).

With the above described arrangement of gearing it is apparent that shafts 189 and 194 will be rotated in opposite directions which requires, as noted above, the use of a single gear 196 in the pile gear train in place of the two gears 191 and 192 in the counterpile gear train so that ring gears 71 and 82 will be rotated in the same direction. Since shaft 187 is driven through change speed gears 184, 185 and 186, which are selected for the diameter of the tube 24 to be napped, and since the change speed gears 184, 185 and 186 are driven at the speed of the main drive motor 62 it is apparent that shafts 189 and 194 are rotated at speeds which are proportional to the basic velocity for the napping belts determined by the product of the R. P. M. of assembly 39 and the diameter of tube 24. However, as noted above, the speed of the napping belts is not this basic velocity but is this basic velocity plus or minus a small increment thereof as determined by the degree of napping desired. For example, for a basic velocity or surface speed of the napping belts of 3800 inches per minute the increment of velocity would probably range from plus 300 inches per minute to minus 300 inches per minute. This increment of speed is provided by variable speed motor 230 driving gear 227 to rotate yoke 209 and gears 218 and 219 and gears 216 and 217 thus reducing or increasing the R. P. M. of shafts 189 and 194 by the desired amounts.

As generally described when considering Fig. 1, the rollers guiding and supporting the upper end of mandrel 35 are adjustable to receive various diameter mandrels and are arranged to be easily displaced to permit ready removal and replacement of mandrels. Suitable structure for these purposes is shown in Figs. 13 and 14. In these figures the framework generally indicated at 41 includes a pair of spaced parallel frames 231 and 232 secured in spaced relationship by cross frame member 233. Frames 231 and 232 support bearings 234 and 235 respectively in which shaft 236 is mounted for rotation. Roller 43 is mounted on shaft 236. Framework 41 also includes a second pair of spaced frames one of which is shown at 237. This second pair of frames supports a shaft 238 which carries roller 42 and the frames are secured in spaced relationship by cross frame member 239. The two pairs of frames are so arranged that rollers 42 and 43 bear on opposite surfaces of flattened portion 37 of mandrel 35. The pairs of frames are locked together adjacent their tops by any suitable manually actuatable locking mechanism 240.

Hangers 241, 242 and 243 are secured to any suitable cross frame member 21 and terminate in bearings to receive a suitable shaft 244 for rotation therein. Frames 231 and 232 are mounted for rotation on shafts 244 and 245 and 246 respectively. Shaft 244 is threaded at 247 and 248 and threads 247 and 248 are oppositely disposed. Internally threaded travelling blocks 249 and 250 are mounted on threads 247 and 248 respectively. Hangers 251 similar to hangers 241, 242 and 243 support a shaft 252 which is identical to shaft 244 and the pair of frames 237 is rotatably mounted thereon as at 253.

Shaft 252 is similarly threaded to shaft 244 and carries travelling blocks similar to blocks 249 and 250. A shaft 254 is mounted in block 249 and is also mounted in the corresponding block on shaft 252. One of rollers 44 is mounted on shaft 254. A shaft 255 is mounted in block 250 on shaft 244 and is also mounted in the corresponding block on shaft 252. The other of rollers 44 is mounted on shaft 255.

Shafts 244 and 252 are rotated to move the travelling blocks and rollers 44 supported therebetween to permit use of mandrels of various diameters by hand wheel 256 which is mounted on shaft 257 to which gear 258 is secured. Gear 258 meshes with gears 259 and 260 which are secured respectively on shafts 244 and 252. Rotation of hand wheel 256 therefore adjusts the positions of rollers 44 equally on opposite sides of the mandrel 35 and permits the employment of various diameter mandrels. By unlocking the latches 240 the pairs of frames carrying rollers 42 and 43 can be rotated away from each other to permit withdrawal of mandrel 35 from the top of the napper. When mandrel 35 is replaced rolls 42 and 43 are again brought into contact with flattened surfaces 37 of the mandrel 35 and are locked in position.

With the illustrative embodiment of the napper of the present invention set up as described the operation of the same is as follows. A tube of material 24 to be napped is mounted upon roll 23 and one end thereof is led over roller 27 and under roller 28 and is then passed upwardly between rollers 32 and 33 and between the pair of rollers 34. The end of tube 24 is then passed upwardly between the pile and counterpile napping belts and between the pair of rollers 44 and between rollers 42 and 43, which are in opened position. The mandrel 35 is then introduced into tube 24 and is lowered therein until its flattened end 36 rests between rollers 32 and 33. Rollers 42 and 43 are rotated into closed position and are locked in position engaging flattened surfaces 37 of mandrel 35. The end of tube 24 is then passed over drive roll 45 and between rolls 52 and 53 and onto take-up roll 54. The position of rolls 44 may now be adjusted for the diameter of the mandrel 35 and tube 44 using hand wheel 256. Change speed gears 184, 185 and 186 are now selected and mounted in position for the diameter of the tube 24 being napped to determine the basic velocity for the napping belts. The tension of the napping belts on the tube 24 is regulated as desired by rotation of shaft 160 and the angularity of the napping belts with respect to the direction of motion of tube 24 is established by rotation of the hand wheels 149 so that the napping action is at right angles to the composite relative motion of the tube 24.

When the electronic control system has been heated the napper may be started. The motors 62, 48, 56, and 230 are energized. Napping assembly 39 is rotated in bearings 38 and 40; pile and counterpile belts are rotated on their supporting rolls by the described gear trains; feed roller 45 draws tube 24 through the napper; and take-up roll 54 winds up the napped tube. During napping of the tube 24 the speed of motors 48 and 230 may be regulated to increase or decrease the speed of tube 24 over mandrel 35 and to increase or decrease the velocity increment supplied to the basic velocity of the pile and counterpile napping belts to obtain the desired degree of napping of tube 24.

The problem of collection of lint so as to prevent clogging of the napping action is solved in the present invention by utilizing the fan action of the planetary assembly 39 as it is rotated about its axis. To this end a helical housing 262 (Fig. 2) is placed around the assembly 39 and, with assembly 39 rotating in a counterclockwise direction, as seen in Fig. 2, is provided with its discharge opening at 263 where a bag or other suitable means may be provided to collect the lint.

It will now be apparent that by the present invention a novel napper is provided which in every way satisfies the several objects discussed above.

Changes in or modifications to the above described illustrative embodiment of the present invention may now be suggested to those skilled in the art without departing from the present inventive concept and reference should be had to the appended claims to determine the scope of this invention.

What is claimed is:

1. In a napper for tubular cloth, a rotating assembly, a mandrel disposed axially within said assembly, means for feeding the tube of cloth over said mandrel, pile napping belts mounted for rotation in said assembly on one side of said mandrel, counterpile napping belts mounted for rotation in said assembly on the other side of said mandrel, means for rotating said assembly, power take-off means from said rotating means for rotating said pile and counterpile napping belts including change speed gearing to provide a basic velocity for said belts equal to the product of the R. P. M. of said assembly and the diameter of the tube of cloth, and means for supplying a limited variation to said basic velocity.

2. In a napper for tubular cloth, a rotating assembly, a mandrel disposed axially within said assembly, means for feeding the tube of cloth over said mandrel, pile napping belts in said assembly on one side of said mandrel, means for mounting said pile napping belts for rotation, means for rotating said mounting means to adjust the angularity of said pile napping belts with respect to the axis of said mandrel and of the tube, counterpile napping belts in said assembly on the other side of said mandrel, means for mounting said counterpile napping belts for rotation, means for rotating said last named mounting means to adjust the angularity of said counterpile napping belts with respect to the axis of said mandrel and of the tube, means for rotating said assembly including power take-off means for rotating said napping belts, adjustable gearing in said power take-off means to provide a basic velocity for said napping belts equal to the product of the R. P. M. of said assembly and the diameter of the tube, and means for supplying a limited variation to said basic velocity.

3. In a napper for tubular cloth, a rotating assembly, a mandrel disposed axially within said assembly, means for feeding the tube of cloth over said mandrel, pile napping belts in said assembly, means for mounting said pile napping belts for rotation, means for moving said mounting means toward and away from said mandrel and the tube of cloth to permit napping of tubes of cloth of various diameters and to adjust the tension of said pile napping belts with respect to the tube, counterpile napping belts in said assembly, means for mounting said counterpile napping belts for rotation, means for moving said last named mounting means toward and away from said mandrel and the tube to permit napping of tubes of cloth of various diameters and to adjust the tension of said counterpile napping belts with respect to the tube, means for rotating said assembly including power take-off means for rotating said napping belts, change speed gearing in said power take-off means to provide a basic velocity for said belts equal to the product of the R. P. M. of said assembly and the diameter of the tube, and means for supplying a limited variation to said basic velocity.

4. A napper as described in claim 3 in which said means for moving said pile and said counterpile napping belts toward and away from said mandrel and the tube are actuated in unison by a common manual means.

5. In a napper for tubular cloth, a rotating assembly, a mandrel disposed axially within said assembly, means for feeding the tube of cloth over said mandrel, pile napping belts in said assembly, means for mounting said pile napping belts for rotation, means for rotating said mounting means for adjusting the angularity of said pile napping belts with respect to the axis of said mandrel and of the tube, means for moving said mounting means toward and away from said mandrel and the tube to permit napping of various diameter tubes and to adjust the tension of said pile belts on the tube, counterpile napping belts in said assembly, means for mounting said counterpile napping belts for rotation, means for rotating said last named mounting means for adjusting the angularity of said counterpile napping belts with respect to the axis of said mandrel and of said tube, means for moving said last named mounting means toward and away from said mandrel and the tube to permit napping of various diameter tubes and to adjust the tension of said counterpile belts on the tube, means for rotating said assembly including power take-off means for rotating said belts, change speed gearing in said power take-off means to provide a basic velocity for said belts equal to the product of the R. P. M of said assembly and the diameter of the tube, and means for supplying a limited variation to said basic velocity.

6. A napper as described in claim 5 in which said means for moving said pile and said counterpile napping belts toward and away from said mandrel and the tube are actuated in unison by a common manual means.

7. In a napper for tubular cloth, a rotating assembly, a mandrel disposed axially within said assembly, variable speed means disposed above said assembly for feeding the tube of cloth over said mandrel, pile and counterpile napping belts mounted for rotation on opposite sides of said mandrel, constant speed means for rotating said assembly, means for rotating said napping belts at a basic velocity equal to the product of the R. P. M. of said assembly and the diameter of the tube including change speed gearing to compensate for the various diameter tubes to be napped, means for supplying a limited variation to said basic velocity, means for controlling the speed of said variable speed means, and means for controlling the amount of variation supplied to said basic velocity, said last two named means determining in greater part the degree of napping of the tube.

8. In a napper for tubular cloth, a rotating assembly, a mandrel disposed axially within said assembly, variable speed means disposed above said assembly for drawing the tube of cloth over said mandrel, pile and counterpile napping belts mounted for rotation on opposite sides of said mandrel, constant speed means for rotating said assembly, means driven by said constant speed means including adjustable gearing and a differential gear box for rotating said napping belts at a basic velocity equal to the product of the R. P. M. of said assembly and the diameter of the tube, means driving into said gear box to provide a limited variation to said basic velocity, means for controlling the speed of said variable speed means, and means for controlling said driving means to determine the variation supplied to said basic velocity, said last two named means determining in greater part the degree of napping of the tube.

9. In a napper for tubular cloth, a rotating assembly, a mandrel removably mounted axially in said assembly, a variable speed feed roller disposed above said assembly for drawing the tube of cloth over said mandrel, pile and counterpile napping belts mounted for rotation in said assembly on opposite sides of said mandrel, constant speed means for rotating said assembly, power take-off means driven by said constant speed means for rotating said napping belts, adjustable gearing in said power take-off means to provide a basic velocity for said belts equal to the product of the R. P. M. of said assembly and the diameter of the tube, differential gearing in said power take-off means driving a shaft for rotating said pile napping belts and driving a second shaft for rotating said counterpilenapping belts, variable speed means for rotating said differential gearing to supply an increment to said basic velocity, means for controlling the speed of said variable speed roller, and means for controlling the speed of said variable speed means rotating said differential gearing.

10. A napper as described in claim 7 including means for driving a take-up roll for the napped tube at constant tension, said constant tension driving means exerting no influence on the feed of the tube over said mandrel.

11. In a drive for a napper for tubular cloth including a rotating assembly and pile and counterpile napping belts rotatably mounted in the assembly for napping the tube as it passes axially through the assembly, a constant speed motor rotating the assembly, means driven by said motor for rotating adjustable gearing, differential gearing means driven by said adjustable gearing, means driven by said differential gearing means for rotating the pile napping belts, means driven by said differential gearing means for rotating the counterpile napping belts, variable speed means for rotating said differential gearing means, said adjustable gearing supplying a basic velocity for said napping belts equal to the product of the R. P. M. of the assembly and the diameter of the tube, said variable speed means for rotating said differential gearing means supplying an increment to said basic velocity, and means for controlling said variable speed means.

12. In a drive as described in claim 11, said differential gearing means including a gear driven by said adjustable gearing, a yoke, a pair of oppositely disposed gears mounted in said yoke and driven by said first named gear, a pair of oppositely disposed shafts each terminating in a gear meshing with said pair of oppositely disposed gears, one of said shafts driving the pile napping belts and the other of said shafts driving the counterplie napping belts, and said variable speed means for rotating said differential gearing means including a ring gear carried by said yoke and a gear meshing with said ring gear and driven by a variable speed motor.

13. In a drive for a napper for tubular material including a rotating assembly having upper and lower supporting hubs and pile and counterpile napping belts rotatably mounted in the assembly for napping the tube as it passes axially through the assembly, a constant speed motor, a ring gear secured to the lower hub, gearing connecting said motor and said ring gear to rotate the assembly, a ring gear mounted for rotation on the lower hub, a ring gear mounted for rotation on the upper hub, adjustable gearing driven by said motor, differential gearing driven by said adjustable gearing, a shaft driven by said differential gearing and driving said ring gear on the upper hub, a second shaft driven by said differential gearing and driving said ring gear rotatably mounted on the lower hub, gearing driven by said ring gear on the upper hub for rotating the counterpile napping belts, and gearing driven by said rotatable ring gear on the lower hub for rotating the pile napping belts.

14. A drive as described in claim 13 in which said differential gearing includes a gear driven by said adjustable gearing, a rotatable yoke, a pair of oppositely disposed gears mounted in said yoke and driven by said gear, a second gear meshing with said pair of gears and driving one of said shafts, a third gear meshing with said pair of gears and driving the other of said shafts, a ring gear connected to said yoke, and variable speed means for driving said ring gear connected to said yoke.

15. In a rotatable napping belt assembly including upper and lower hubs supporting parallel and spaced upper and lower plates and uprights connecting the plates, a hollow hub supported by the uprights, a hollow trunnion rotatably mounted for axial movement in said hub, framing carried by said trunnion, a pair of spaced parallel shafts rotatably mounted in said framing, pulleys mounted on said shafts, endless napping belts mounted on said pulleys, and driving means mounted in the uprights and extending through said hollow hub and through said hollow trunnion and rotating one of said shafts.

16. A napping belt assembly as described in claim 15 in which a third shaft is rotatably mounted in said framing parallel to and spaced from the shaft of said pair of shafts which is not driven by said driving means, cleaning rolls on said third shaft for cleaning said napping belts, and gearing connecting said third shaft to the adjacent one of said pair of shafts.

17. A napping belt assembly as described in claim 16 in which said third shaft is rotatably mounted in rotatable eccentrics carried by said framing and in which means are provided for rotating said eccentrics to adjust the position of said cleaning rolls with respect to said napping belts.

18. In a rotatable napping belt assembly including upper and lower hubs supporting parallel and spaced upper and lower plates connected by uprights disposed at opposite ends of a diametric plane of said plates, the tube to be napped passing along the axis of rotation of the assembly, a hollow hub carried by each of said uprights, a hollow trunnion rotatably mounted for axial movement in each of said hubs, framing carried by each of said trunnions, a spaced pair of parallel shafts rotatably mounted in each of said frames, pulleys on each of said shafts, endless pile napping belts mounted on said pulleys of one of said pairs of shafts adjacent the axis of rotation of the assembly, endless counterpile napping belts mounted on said pulleys of the other of said pairs of shafts adjacent to the axis of rotation of the assembly and opposite said pile napping belts, and driving means supported by each of said uprights and extending through the adjacent hollow hub and hollow trunnion and rotating one of the adjacent pair of shafts.

19. A napping belt assembly as described in claim 18 in which a third shaft is rotatably mounted in each of said framings parallel to the adjacent pair of said pairs of shafts, cleaning rolls carried by said third shaft for cleaning said adjacent napping belts, and gearing connecting said third shaft to the adjacent shaft of said adjacent pair of shafts.

20. A napping belt assembly as described in claim 19 in which each of said third shafts is rotatably mounted in an eccentric rotatably mounted in the adjacent one of said framings, and means for rotating said eccentrics to adjust the position of said cleaning rolls with respect to the adjacent napping belts.

21. In a rotatable napping belt assembly including upper and lower hubs supporting spaced parallel upper and lower plates and uprights connecting the plates, a hollow hub supported by the uprights, an externally threaded hollow trunnion mounted in said hollow hub, a nut mounted on said threads and held against movement axially of said hub, means for rotating said nut to move said trunnion axially in said hub, a rack keyed to said trunnion, means for rotating said rack to rotate said trunnion in said hub, endless napping belts rotatably supported by said trunnion, and means for driving said napping belts extending through said hollow hub and through said hollow trunnion.

22. A napping belt assembly as described in claim 21 in which said means for driving said napping belts includes a shaft journaled in said hollow trunnion, a gear mounted on said shaft, and a drive gear meshing with said last named gear and extending into meshing engagement therewith through a wall of said hub.

23. In a rotatable napping belt assembly including upper and lower hubs supporting spaced parallel upper and lower plates and uprights connecting the plates spaced at opposite ends of a diameter of the plates, a hollow hub supported by each of the uprights, an externally threaded hollow trunnion mounted in each of said hollow hubs, a nut mounted on said threads of each of said trunnions, common means for rotating each of said nuts to move each of said trunnions axially in said hubs, a rack keyed to each of said trunnions, individual means for rotating each of said racks to rotate each of said trunnions in said hubs, endless pile napping belts mounted on one of said trunnions, endless counterpile napping belts mounted on the other of said trunnions, and means for driving said napping belts extending through each of said hollow hubs and through each of said hollow trunnions.

24. In a napper, endless pile napping belts, endless counterpile napping belts disposed opposite to said pile napping belts, means for rotating said pile and said counterpile napping belts, means for rotating said pile and said counterpile napping belts in a planetary motion about the material to be napped, said napping belts being driven at a basic velocity equal to the product of the R. P. M. of said belts in planetary motion and the diameter of the material being napped, and means for supplying a limited variable increment to said basic velocity.

25. A napper as described in claim 24 in which means are provided for adjusting the angularity of said napping belts with respect to the material being napped, and separate means are provided for adjusting the tension of said napping belts on the material being napped.

ROLAND E. LANGLOIS.
LOUIS G. BLUMENBAUM.

References Cited in the file of this patent

UNITED STATES PATENTS

| Number | Name | Date |
|---|---|---|
| 2,507,038 | Miller | May 9, 1950 |